S. ORBAN.
BEARING.
APPLICATION FILED APR. 4, 1916.
Reissued June 12, 1917. 14,315.
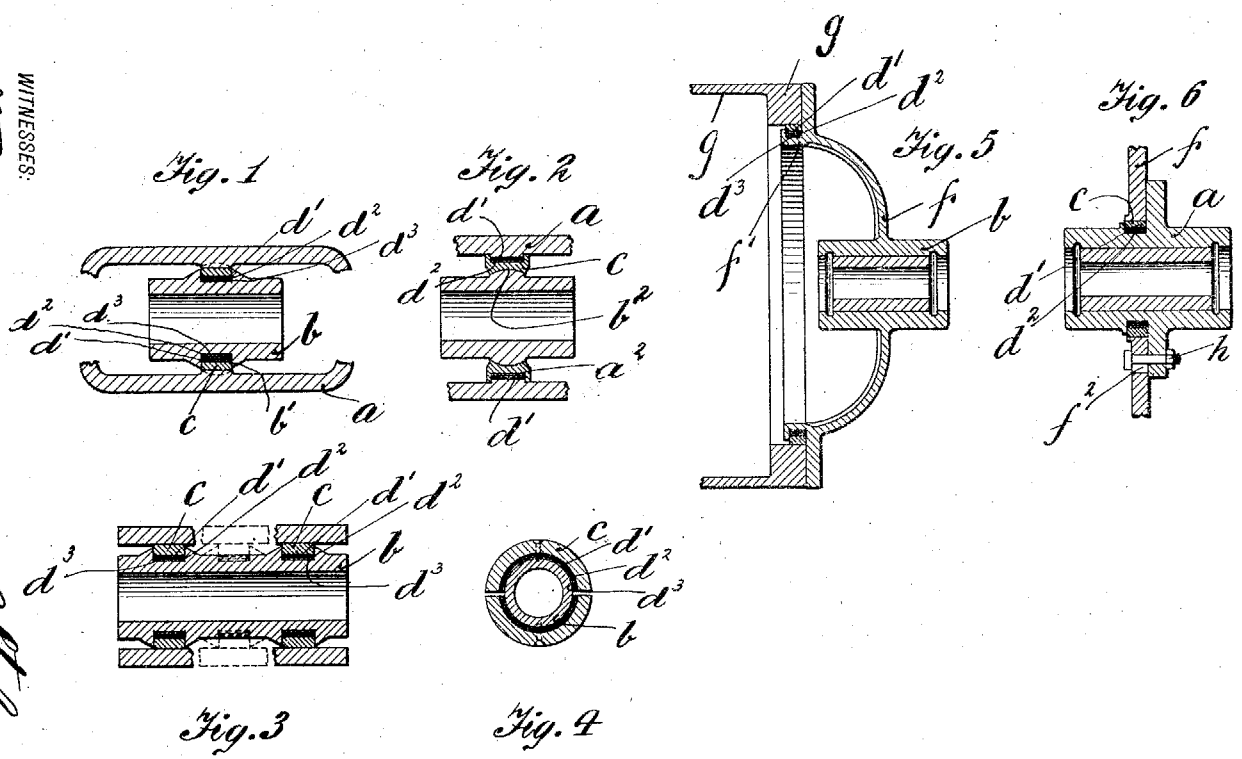
WITNESSES:
A. Schlumberger
A. Ordmann
INVENTOR
Stefan Orbán
BY
Max A. Ordmann
ATTORNEY

UNITED STATES PATENT OFFICE.

STEFAN ORBÁN, OF NEW YORK, N. Y.

BEARING.

14,315. Specification of Reissued Letters Patent. Reissued June 12, 1917.

Original No. 1,105,097, dated July 28, 1914, Serial No. 817,004, filed February 6, 1914. Application for reissue filed April 4, 1916. Serial No. 88,960.

*To all whom it may concern:*

Be it known that I, STEFAN ORBÁN, a subject of the Austro-Hungarian Emperor, residing at New York, in the county of New York and State of New York, have invented certain new and useful Improvements in Bearings, of which the following is a specification.

In some branches of the machine industry, it frequently happens, by reason of wear or because of weight that the operating shafting becomes displaced from its centered position. The displacements or the wear often do not exceed a hundredth part or even much smaller fraction of an inch, yet they may be of great importance for the proper working of the machine. Thus for instance in induction motors in which the bearings of the operating shaft are mounted in the side covers of the motor, the minutest displacements of the shaft must be avoided, in order that the air gaps between the poles of the stator and those of the rotor always remain uniform. With cylinders which are arranged on an angle in form of a V with respect to the crank-shaft it has been found that notwithstanding most careful construction the crank-pin bearing wears off in a relatively short time so that the bearing becomes practically useless. To make such bearing adjustable like ordinary bearings is impracticable for the reason that such bearings must be made very light and therefore do not allow of heavy or complicated parts being added thereto. Another reason is that the connecting rod rotatively engaging around the outer surface of the bearing causes wear on the outer surface of the bearing in addition to the inner wear in consequence of which the bearing wears off very rapidly and would require frequent adjustment.

The object of my invention is to provide a method and means whereby such displacements and wear can be remedied.

My invention will be fully understood by reference to the accompanying drawing in which similar reference characters denote corresponding parts and in which Figures 1, 2 and 3 are longitudinal sections of bearing boxes embodying my invention; Fig. 4 is a cross section of a bearing box; Fig. 5 is a longitudinal section of a motor cylinder in which the bearing for the rotary shaft is formed in the side cover; and Fig. 6 is a longitudinal section of a modification thereof.

My invention resides in the provision of a number of fine sheet metal strips each of, say .005 inches in thickness, which may be inserted at any suitable place of the bearing, either directly between the bearing box and hanger, or between the hanger and the part to which it is fixed or any other convenient place. To effect the readjustment of the displaced shaft, one, two or more strips, according to the extent of displacement, are removed from one place and added to the diametrically opposite place, thereby raising the shaft to its central position. Thus for instance in Fig. 1 a number of semi-circularly curved metal strips $d'$, $d^2$, $d^3$ . . . each of a thickness of a small fraction of an inch are shown arranged in an annular central groove $b'$ of the bearing box $b$ and enveloped by a split ring $c$ adapted to bear with its outer circumference against the walls of the hanger or stationary part $a$. There are two uniform sets of such strips, one set surrounding the upper and the other the lower half of the box. If the box has become displaced from its central position owing to weight of the shafting or for any other reason, one of the metal strips of the upper set (or more if necessary) is removed and added to the lower set. Thereby the bearing box and consequently the shaft are raised to central position. If the bearing is a swivel bearing, the outer circumference of the ring $c$ may be cylindrically curved, as indicated by dotted lines, to engage a correspondingly curved socket in the hanger or part $a$.

In Fig. 2 the sets of metal strips $d'$, $d^2$ . . . are arranged between the hanger $a$ and the split ring $c$. The swivel in this case is formed between the box and inner surface of the ring, as at $b^2$.

In Fig. 3 the same arrangement is shown as in Fig. 1, excepting that instead of a single central support of box $b$ in the hanger there are either two lateral supports or lateral and central supports. In this case the sets of metal strips are arranged in each support in the same manner, as in Fig. 1.

In Fig. 5 the hanger carrying the bearing is represented as side or end cover $f$ of a cylinder $g$ of, say an electric motor. The metal strips $d'$, $d^2$, $d^3$ . . . are shown arranged between an inwardly extending flange $f'$ and the end wall $g'$ of the cylinder $g$. The hanger or part $b$ is shown as an integral piece of the cover $f$.

In Fig. 6 the part $a$ is not integral with the cover, but is fixed to it by bolts $h$ passing through slots $f^2$ in the cover $f$. In this case the metal strips $d'$, $d^2$ . . . may be arranged between the cover $f$ and the part $a$ as shown.

Of course there may be various other ways of arranging the metal strips, without departing from the spirit of my invention, and I therefore do not restrict myself to the arrangements shown and described.

What I claim and desire to secure by Letters Patent is:

1. The combination with a journal box and a stationary frame, of opposite sets of metal strips or shims interposed between the said box and frame and a split ring carrying said metal strips or shims.

2. The combination with a journal box and a stationary frame, of opposite sets of metal strips or shims and a split ring surrounding the latter, said shims and split ring being interposed between the journal box and the stationary frame.

3. In a bearing, the combination with a frame and journal box, of shims and a ring covering such shims, said shims and ring being used for the compensation of worn off parts of the bearing.

In testimony whereof I affix my signature in presence of two witnesses.

STEFAN ORBÁN.